(12) United States Patent
Sheen (10) Patent No.: US 7,145,103 B2
(45) Date of Patent: Dec. 5, 2006

(54) CAR CIGARETTE LIGHTER WITH LIGHT INDICATOR

(76) Inventor: Lighter Sheen, No. 22, Ya Chou Rd., Tucheng City, Taipei County, 236 (TW)

( * ) Notice: Subject to any disclaimer, the term of this patent is extended or adjusted under 35 U.S.C. 154(b) by 571 days.

(21) Appl. No.: 10/607,048

(22) Filed: Jun. 27, 2003

(65) Prior Publication Data

US 2004/0107972 A1    Jun. 10, 2004

(30) Foreign Application Priority Data

Dec. 9, 2002    (TW) .............................. 91219904 U (51) Int. Cl.
*F23Q 7/22* (2006.01)
*F23Q 7/00* (2006.01)

(52) U.S. Cl. ...................................... 219/269; 219/260

(58) Field of Classification Search ........ 219/260–269, 219/248, 487, 506, 220
See application file for complete search history.

(56) References Cited

U.S. PATENT DOCUMENTS

| | | | | |
|---|---|---|---|---|
| 4,456,817 A * | 6/1984 | Mehnert et al. | ............ | 219/263 |
| 4,650,962 A * | 3/1987 | Pramaggiore | ............... | 219/264 |
| 6,444,953 B1* | 9/2002 | Leishman | .................... | 219/269 |
| 6,538,236 B1* | 3/2003 | Rostan | ....................... | 219/267 |
| 6,740,850 B1* | 5/2004 | Mattis | ........................ | 219/265 |
| 6,794,613 B1* | 9/2004 | Krumholz | .................... | 219/269 |

* cited by examiner

Primary Examiner—Daniel Robinson (57) ABSTRACT

A car cigarette lighter with a light indicator includes a power socket and a cigarette lighter. The car cigarette lighter is characterized in attaching an external sleeve to a bottom tube of a handle, and installing a circuit board in electric connection with a circuit of the car cigarette lighter in the external tube. The circuit board has at least one light emitting diode located at a bottom of the transparent handle. A switch in electric connection with the car cigarette lighter is further mounted on the external sleeve. By plugging the car cigarette lighter into the power socket and pushing the handle, the circuit board is conducted, and the light emitting diode is switched on. By the switch of the external sleeve, the electro-thermal winding film is conducted and heated. When the winding film is heated to a high temperature, the clip in the tube of the power socket releases the internal cap of the internal tube, such that the internal tube of the car cigarette is pushed outward to form an open circuit, such that the light emitting diode is switched off. Therefore, the light emitting diode provides the inspection, indication and illumination effects.

6 Claims, 14 Drawing Sheets

FIG. 14
PRIOR ART

CAR CIGARETTE LIGHTER WITH LIGHT INDICATOR

BACKGROUND OF THE INVENTION

The present invention relates generally to car cigarette lighter and, more particularly, to a car cigarette lighter having a light emitting diode and a switch installed on a push handle thereof. Therefore, when the car cigarette lighter is plugged in the power socket and conducted with an electric power source, the light emitting diode is switched for indication and illumination.

Figure 10:
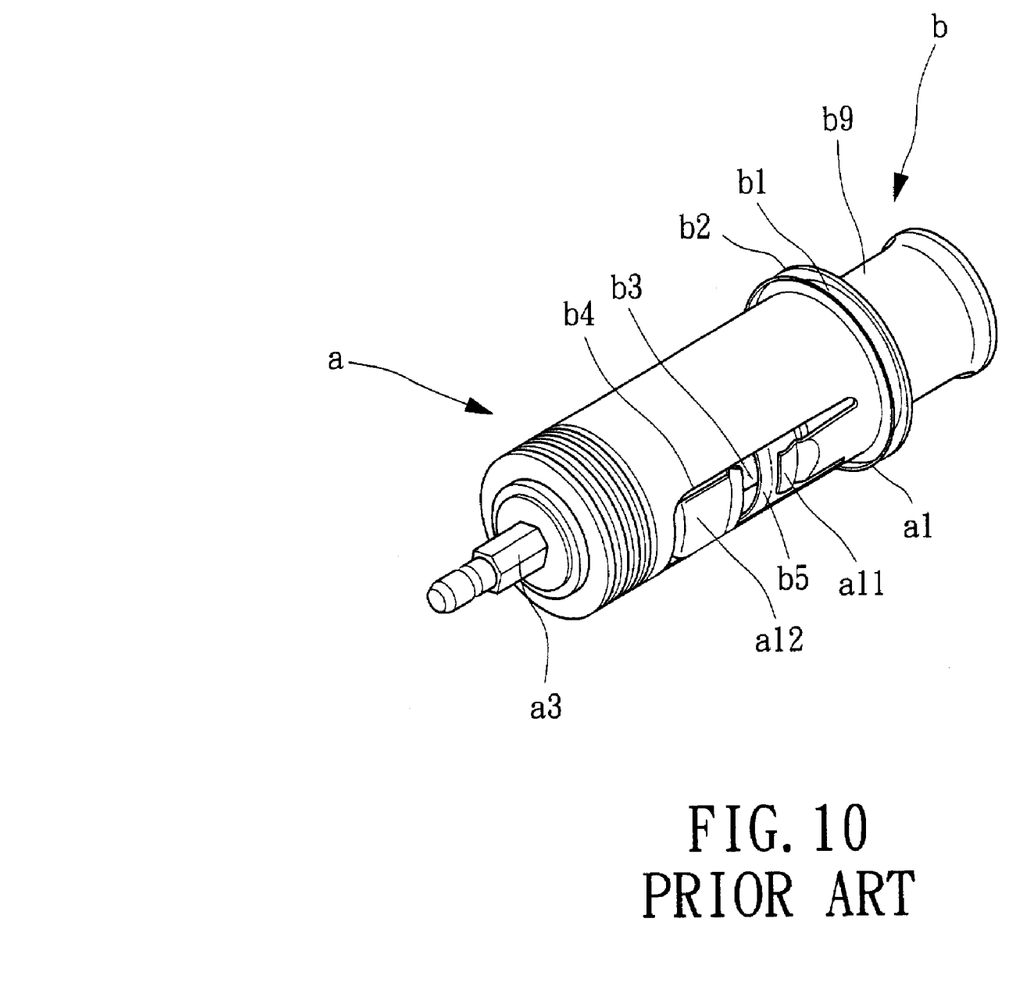
FIG. 10 shows a perspective view of a conventional car cigarette lighter.
Figure 11:
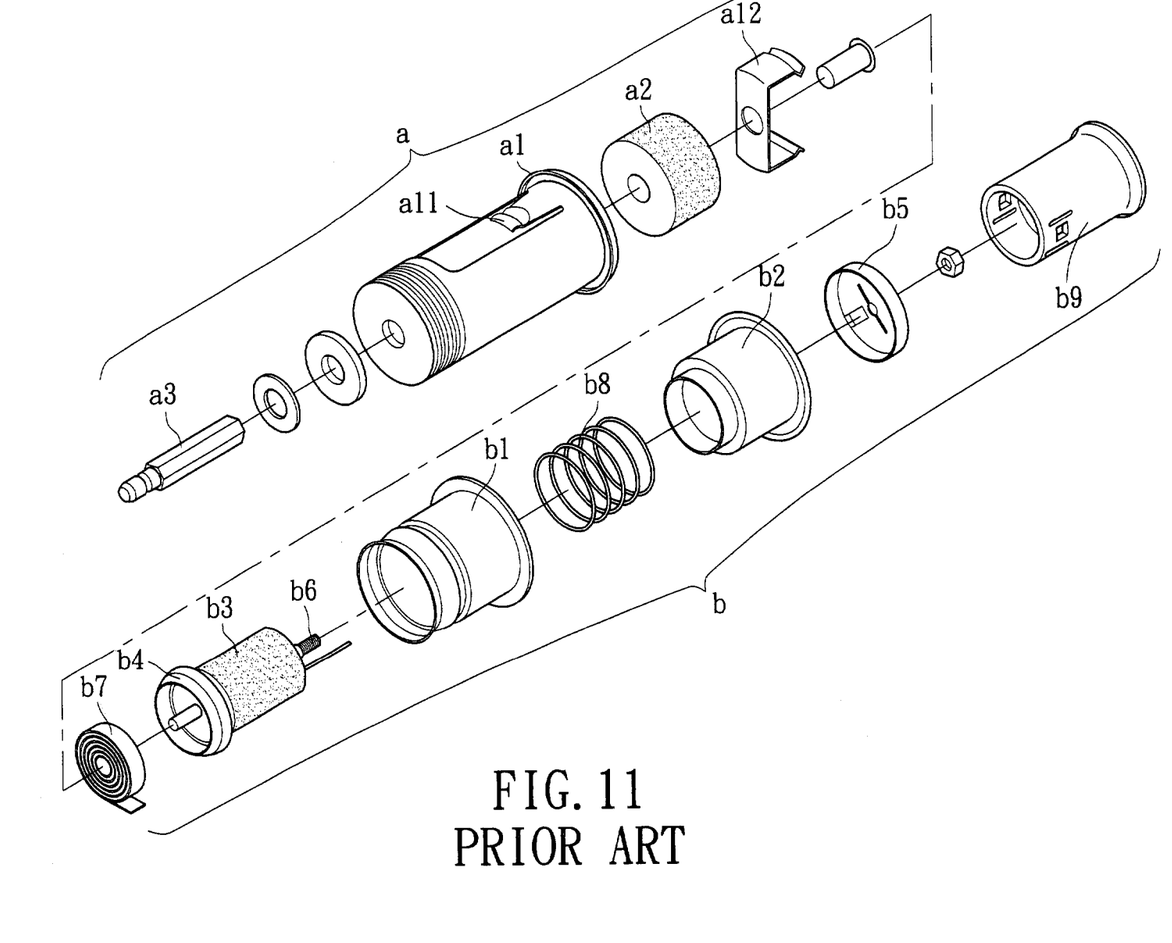
FIG. 11 shows an exploded view of the conventional car cigarette lighter.
Figure 12:
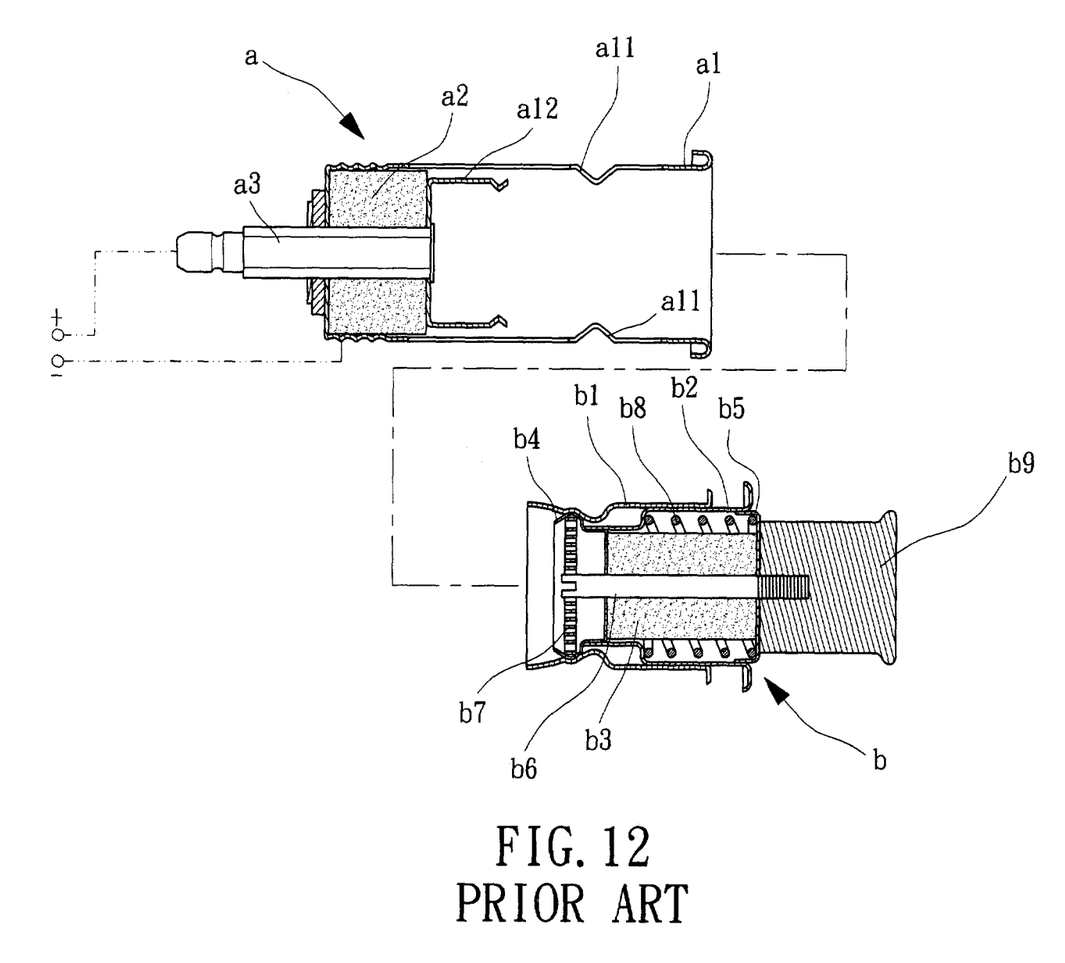
FIG. 12 shows a cross sectional view of conventional assembly of a power socket and a lighter.

FIGS. 10, 11 and 12 show the structure of a conventional car cigarette lighter. The car cigarette lighter includes a power socket a and a lighter b. The power socket a includes two opposing splints all formed on a side wall of an elongate tube a1 of the power socket a. A clip a12 is formed on an interior bottom of the tube a1. The clip a12 and the tube a1 are insulated from each other by an insulation block a2. An elongate conducting bar a3 connecting the clip a2 extends over the elongate tube a1 along an axis thereof. The conducting bar a3 and the elongate tube a1 connects the anode and the cathode of the power source, respectively. The lighter b includes an external tube b1 encasing an internal tube b2. An insulation column b3 is inserted into the internal tube b2 and terminated with an internal cap b4 and an external cap b5 at two opposing ends thereof. A central bar b6 extends through the internal cap b4 and the insulation column b3. A winding film b7 is installed at the end of the central bar b6 within the insulation column b3, a spring b8 is installed between the internal tube b2 and the external cap b5, and a push handle b9 is installed on the external cap b5.

Figure 13:
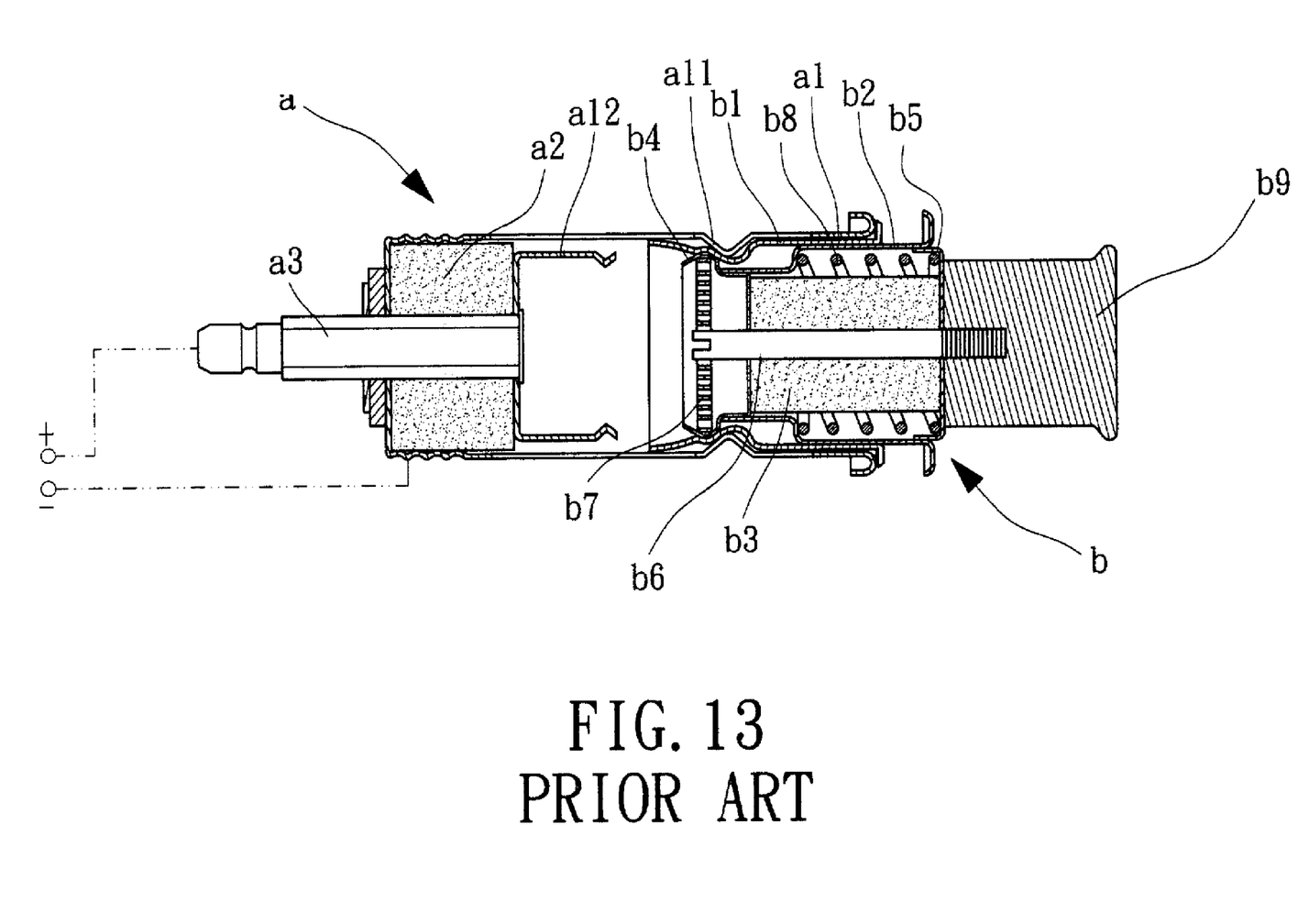
FIG. 13 shows a cross sectional view of the conventional assembly when the lighter is plugged into the power socket.
Figure 14:
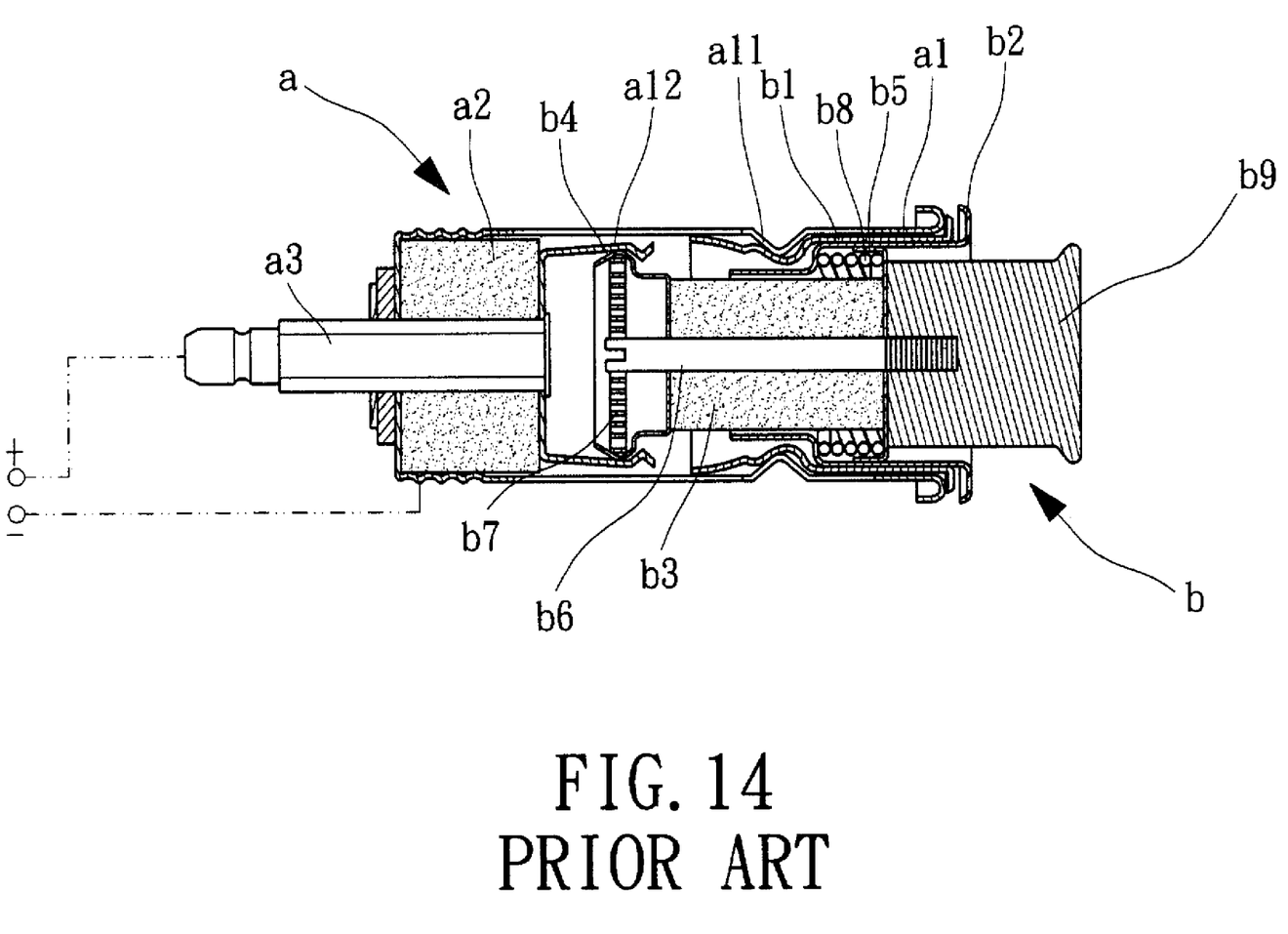
FIG. 14 shows a cross sectional view of the conventional assembly when the lighter is pushed into the power socket.

Under the idle condition, when the lighter b is inserted into the power socket a, the splints all on the sidewall of the tube a1 clips over the external tube b1 as shown in FIG. 13. To operate, the lighter b is pushed, such that the internal tube b2 extends into the tube a1 of the power socket a. The clip 12 at the bottom end of the tube a1 of the power socket a clips the internal cap b4 of the internal tube b2 as shown in FIG. 14. As the conducting bar a3 and the tube a1 are connected to the anode and cathode of the power source, respectively, and the clip a12 of the power socket a is connected to the conducting bar a3, current is conducted to flow to the electro-thermal winding film b7 through the internal cap b4. Meanwhile, the external tube b1 is in contact with the tube a1 of the power socket a, so that current flows to the center of the electro-thermal winding film b7 via the external tube b1, the internal tube b2 and the central bar b6. Thereby, a current look is established, and the electro-thermal winding film b7 is conducted and heated.

While the electro-thermal winding film b7 is heated to a certain temperature, the clip a12, being affected by the electro-thermal winding film b7, is released. The internal tube b2 of the lighter b is thus contracted into the external tube b2 by the recoil force of the spring b8, and an open circuit is formed. The electro-thermal winding film b7 is also heated enough to light a cigarette.

However, when the lighter b is pushed into the power socket a, only the push handle b9 is slightly embedded in the tube a1 of the power socket a. It is hard for the user to observe whether the lighter b has been conducted and heated. That is, the heating condition of the lighter is not easily observable for the user.

Further, while driving at night, in addition to the light of the dash panel, the reading light is normally switched off to avoid affecting the driver. It is thus very dark in the car.

BRIEF SUMMARY OF THE INVENTION

The present invention provides a car cigarette lighter with a light indicator. The car cigarette lighter is characterized in encasing a bottom tube of a push handle with an external sleeve, and installing a transparent handle on the external sleeve. A circuit board in electric connection with a lighter circuit is installed in the external sleeve, and the circuit board includes at least one light emitting diode located at a bottom of the transparent handle. The external sleeve further comprises a switch electrically connected to the lighter circuit. When the lighter is plugged in the power socket, the switch on the external sleeve is switched on, and the light emitting diode is conducted to emit a light.

Therefore, the present invention installs a light emitting diode and a switch on a push handle of a car cigarette lighter, such that when the lighter is conducted, the user or driver can easily observe the conducting status by the light generated by the light emitting diode.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
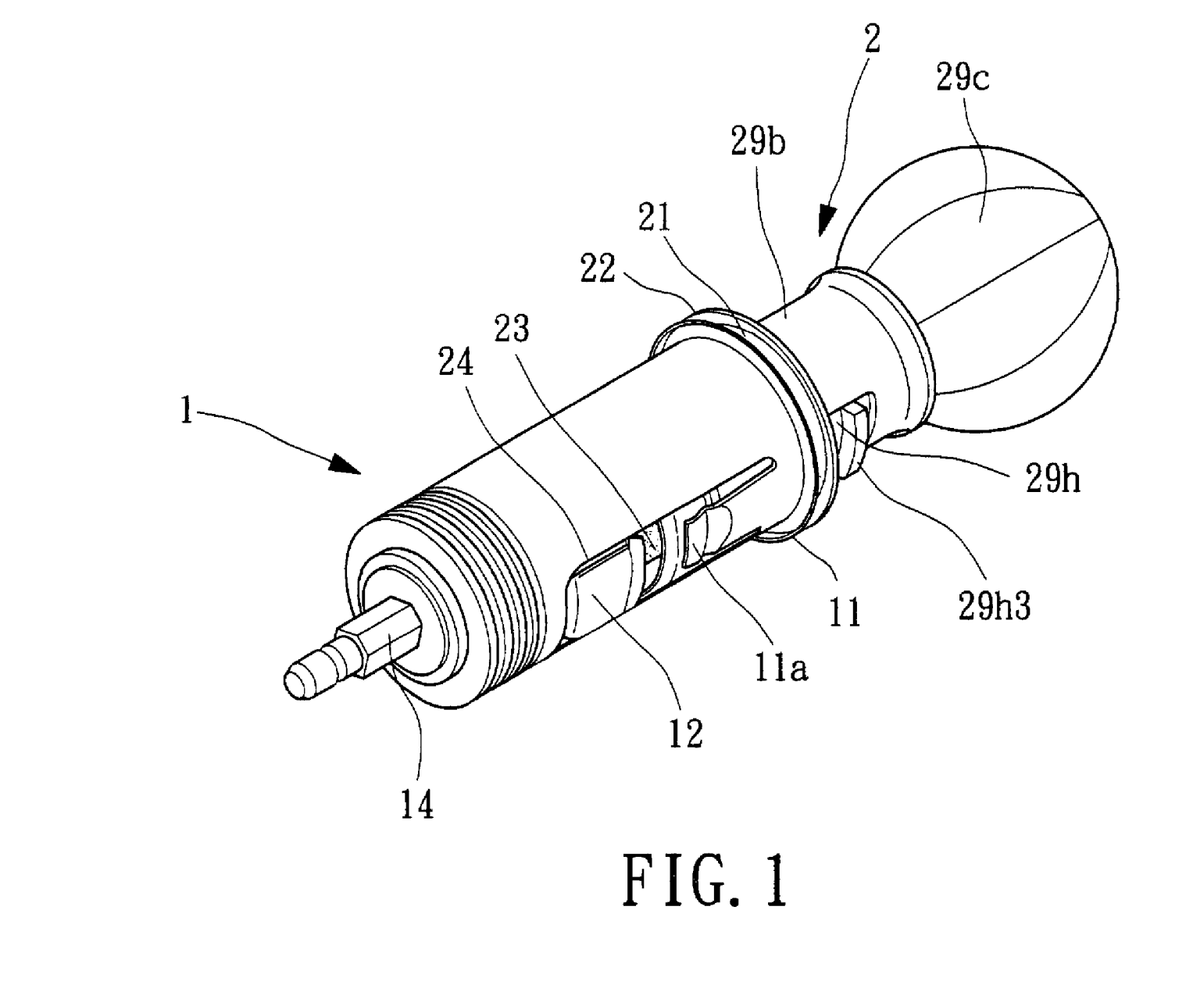
FIG. 1 shows a perspective view of a car cigarette lighter provided by the present invention.
Figure 2:
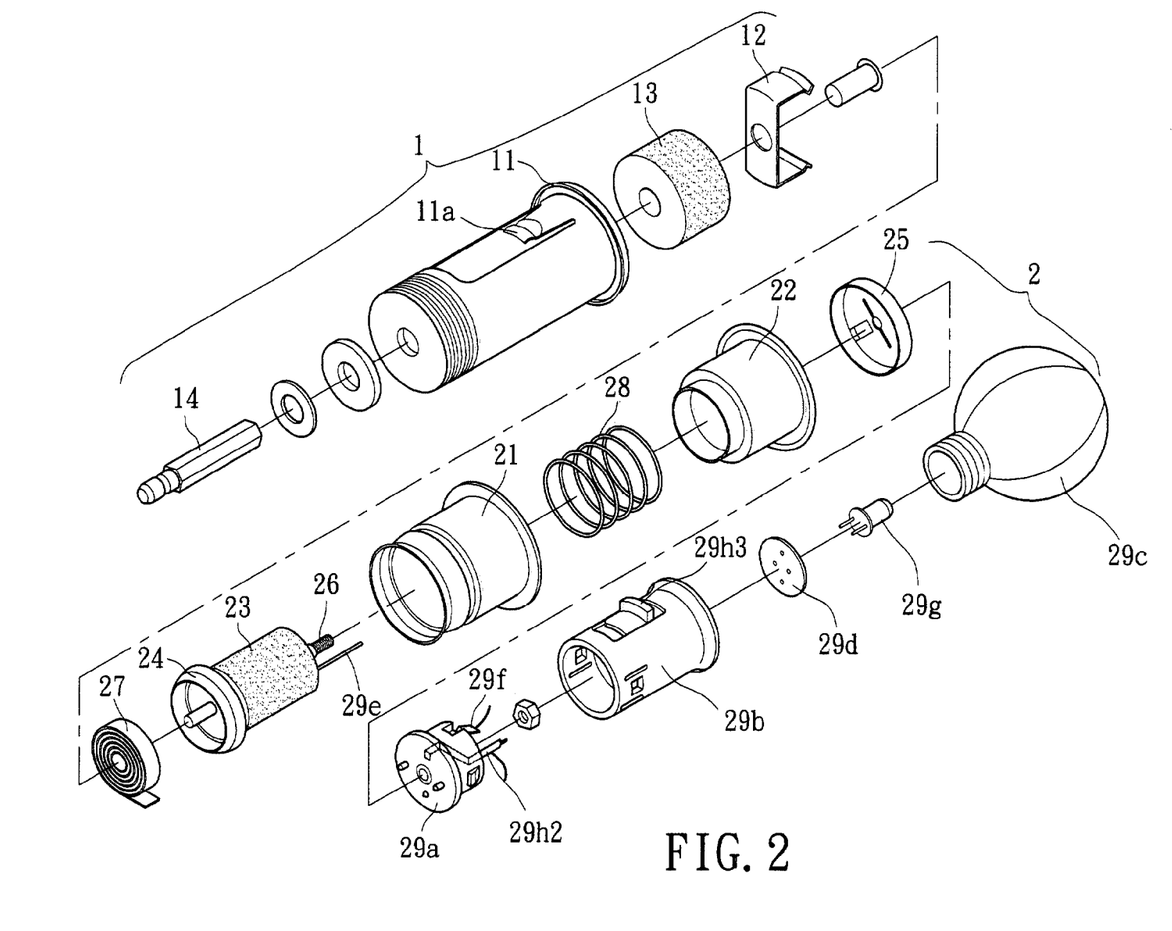
FIG. 2 shows an exploded view of the car cigarette lighter.
Figure 3:
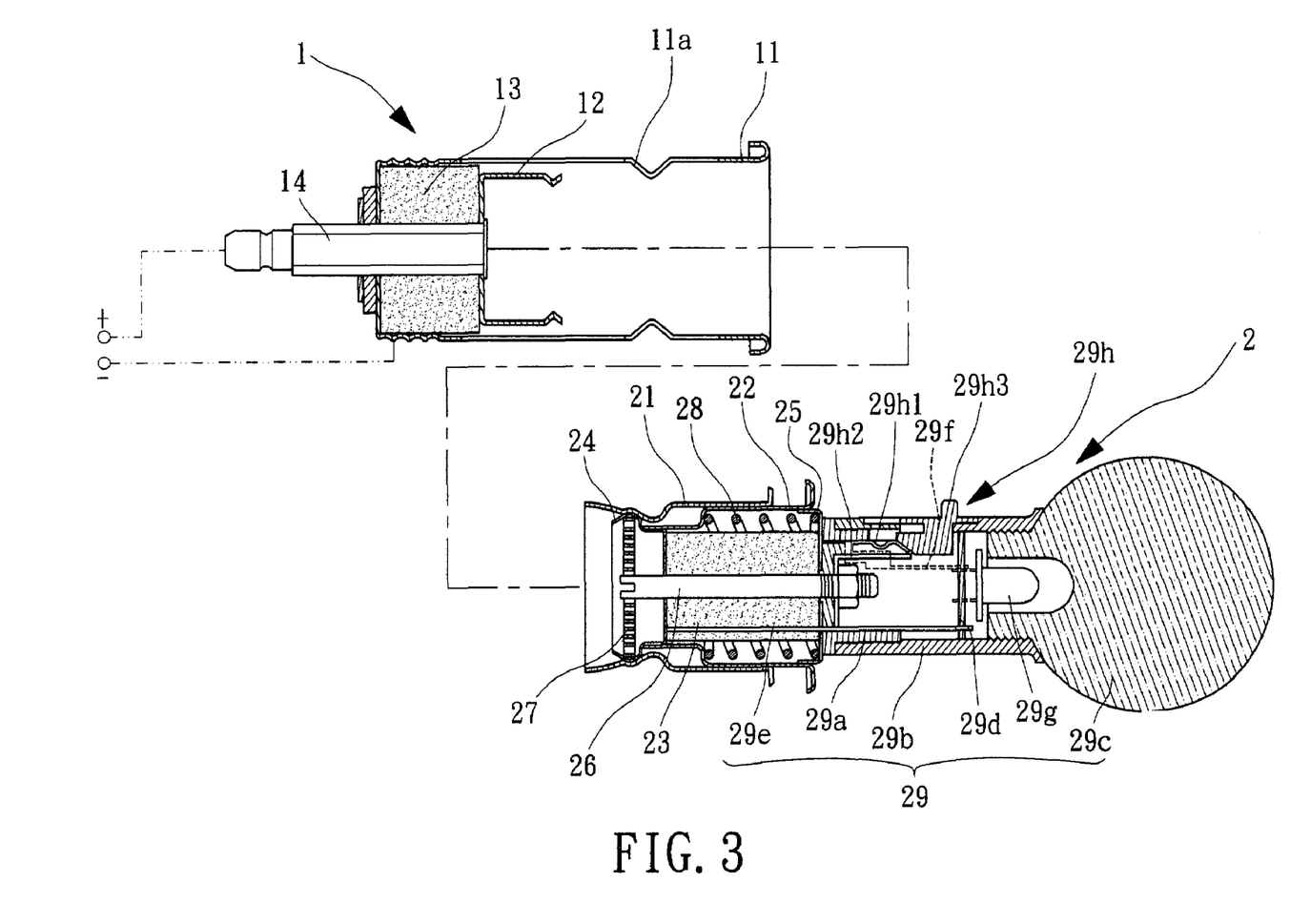
FIG. 3 shows a cross sectional views of the power socket and the lighter.

Referring to FIGS. 1, 2 and 3, the present invention provides a car cigarette including a power socket 1 and a lighter 2. The power socket 1 includes an elongate tube 11, a pair of opposing splints 11a formed on a sidewall of the tube 11, a clip 12 installed in the tube 11, and an insulation block 13 between the tube 11 and the clip 12. A conducting bar 14 connecting the clip 12 extends over the tube 11 along an axis thereof, such that the clip 12 is connected to the anode of a power source via the conducting bar 14, and the tube 11 is connected to the cathode of the power source. The lighter 2 includes an external tube 21 encasing an internal tube 22, an central bar 23 extend through the internal tube 22, an internal cap 21 and an external cap 25 at two ends of the insulation column 23, an electro-thermal winding film 27 on the end of the central bar 23 within the internal cap 24, and a spring 28 between the internal tube 22 and the external cap 25. A push handle 29 is further installed on the on the external cap 26, such that when the lighter 2 is inserted into the power socket 1, the splints 11a clip the external tube 21 of the lighter 2. The lighter 2 is thus pushed allowing the clip 12 of the tube 11 in contact with the internal cap 24 of the internal cap 22. A current loop is thus established to conduct and heat the electro-thermal winding film.

In the present invention, an external sleeve 29b is provided to encase the bottom tube 29a therein by two symmetric protrusions of the bottom tube 29a engaged with two respective grooves of the external sleeve 29b. A transparent handle 29c is mounted to the external sleeve 29. The external sleeve 29b includes a circuit board 29d electrically connected to a lighter circuit of the lighter 2, an anode lead 29e and a cathode lead 29f connected to the internal cap 24 and the external cap 25 respectively. The circuit board 29d further comprises a light emitting diode 29g located a the bottom of the transparent handle 29c and a switch 29h electrically connected to the lighter circuit for controlling heating of the electro-thermal winding film 27. By plugging the lighter 2 in the power socket 2 and pushing the handle 29b to conduct the circuit on the circuit board 29d, the light emitting diode 29g is switched on while the electro-thermal winding film 27 is conducted and heated by the switch 29h. When the electro-thermal winding film 27 is heated to a predetermined temperature, the clip 12 of the tube 11 of the power socket 1 releases the internal cap 24 of the internal tube 22. Thereby, the internal tube 22 is pushed outwardly to form an open circuit of the circuit board 29d. Therefore, the light emitting diode 29g is switched off to indicate the completion of the heating process.

Figure 4:
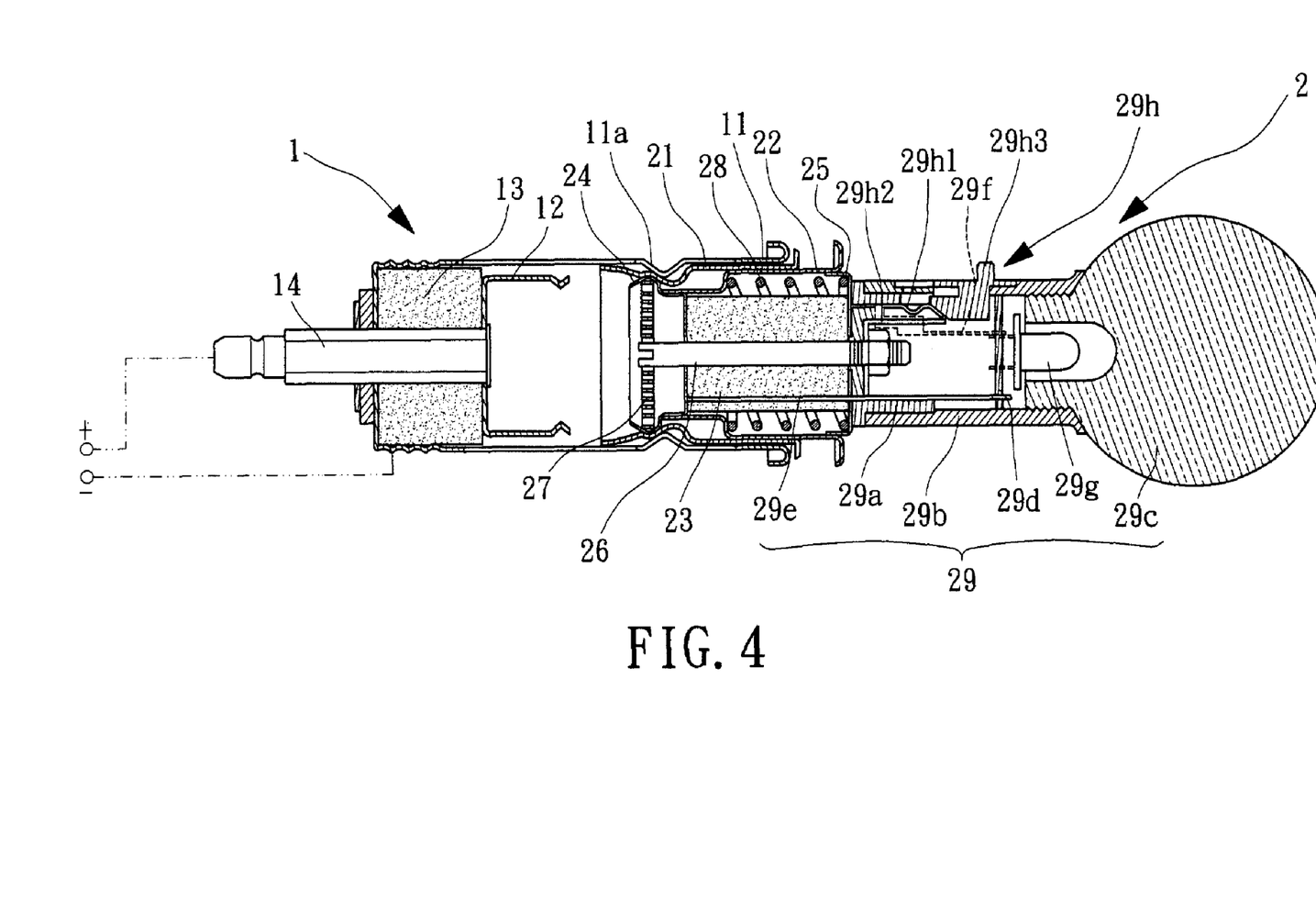
FIG. 4 shows a cross sectional view of the assembly of the power socket and the lighter.
Figure 5:
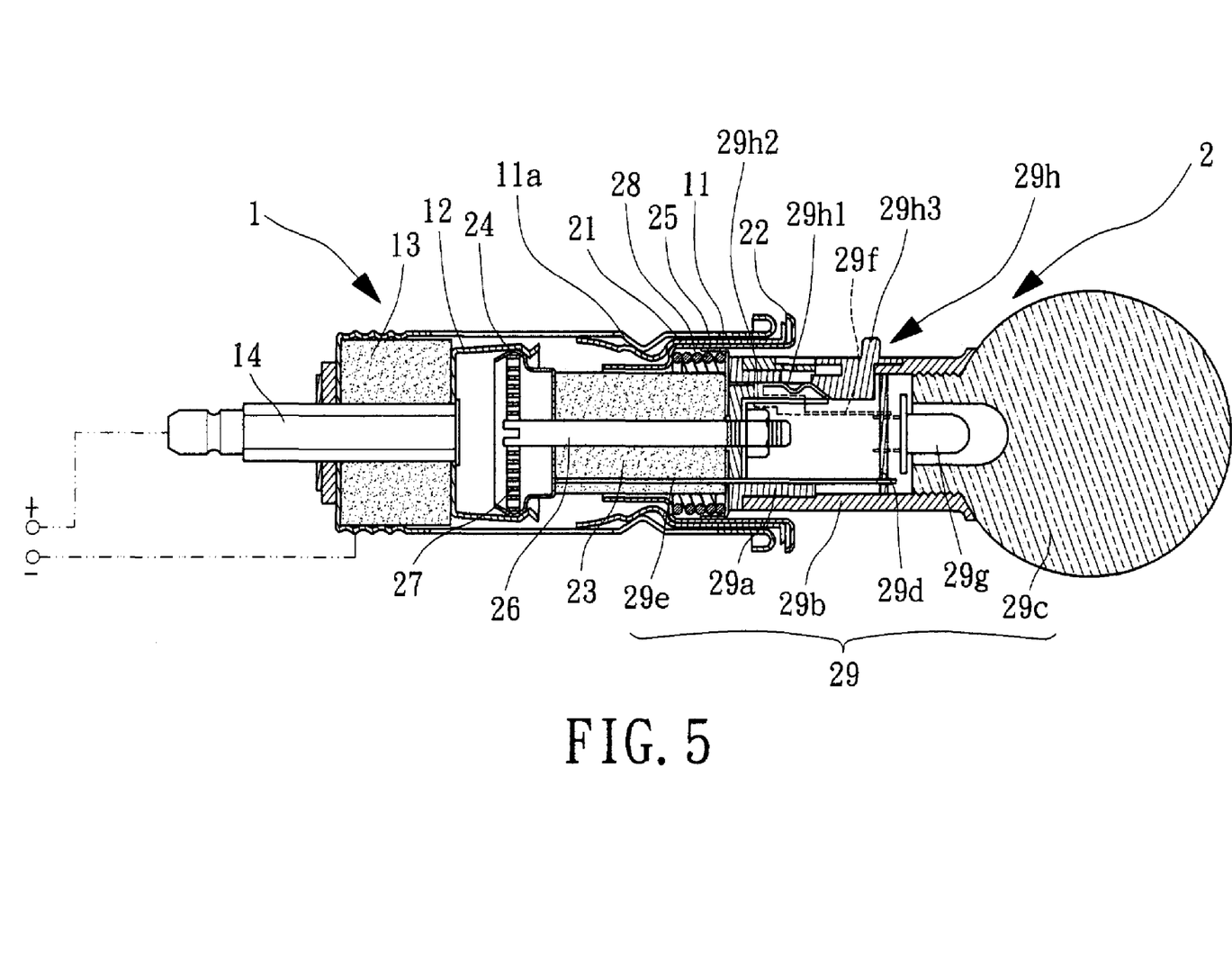
FIG. 5 shows a perspective view of lighter plugged into the power socket.

According to the above structure, when the lighter 2 is inserted into the power socket 1, the opposing splints 11a on the tube 11 first clamps over the external sleeve 21 of the lighter 2. As shown in FIG. 4, if the handle 29 of the lighter 2 is pushed further inwardly, the clip 12 at the bottom of the tube 11 of the power socket 1 is clipping and in contact with the internal cap 24 of the internal tube 22 of the lighter. As shown in FIG. 5, as the clip 12 is connected to the anode and the tube 11 is connected to the cathode, the internal cap 24 is connected to the anode via the clip 12, such that current flows from the anode lead 29e to the circuit board 29d. Meanwhile, as the splints 11a of the tube 11 are in contact with the external tube 21, the cathode is connected to the circuit board 29d via the internal tube 22, the external tube 21 and the tube 11. Thereby, the light emitting diode 29g is activated.

To light a cigarette by the lighter 2, the switch 29h on the external sleeve 21 is controlled to conduct the circuit. When the electro-thermal winding film 27 is heated to a glowing state, the clip 12 at the bottom of the tube 11 is deformed by heat generated by the electro-thermal winding film 27 and released from the internal cap 24 of the lighter 2. The internal tube 22 is thus ejected from the power socket to form an open circuit of the circuit board 29d. Therefore, the light emitting diode 29g is switched off, and the electro-thermal winding film 27 is disconnected and ready for lighting a cigarette.

When the user intends to switch on the light emitting diode 29g without heating the electro-thermal winding film 27, the switch 29 can be switched to an off state, such that when the lighter 2 is plugged in the power socket 1, only the light emitting diode 29g is conducted to provide illumination.

Figure 6:
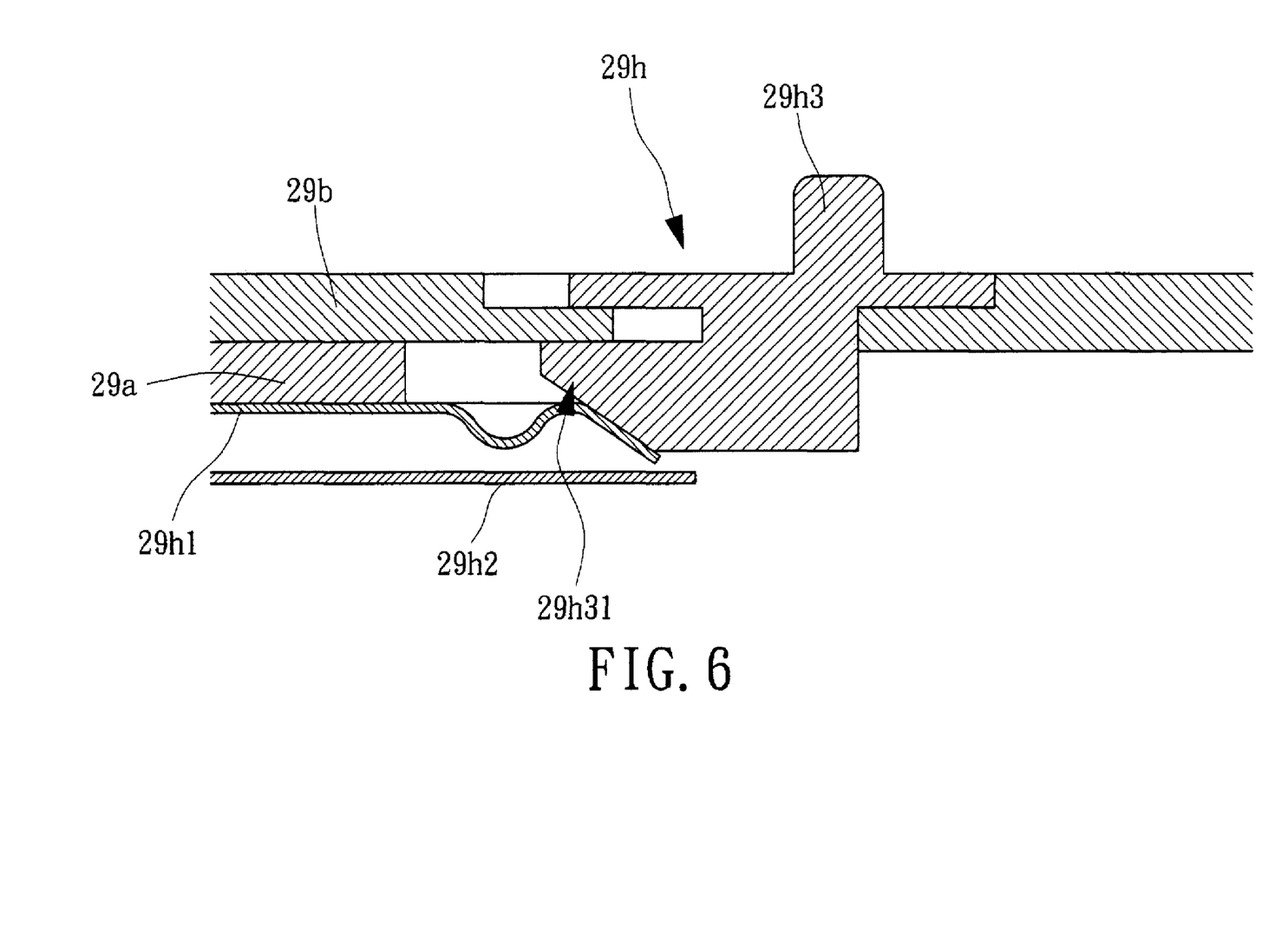
FIG. 6 shows the assembly when the switch is not conducted
Figure 7:
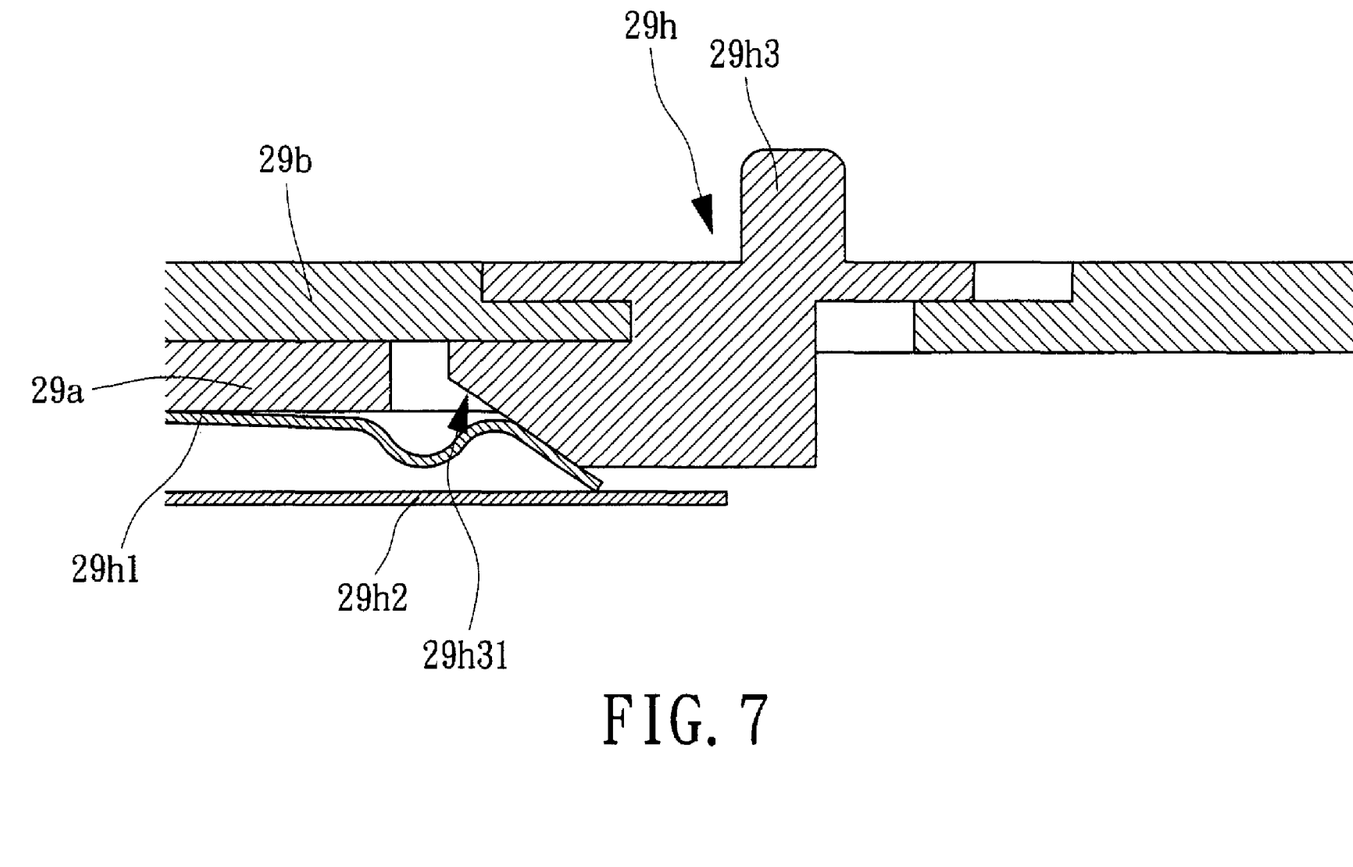
FIG. 7 shows the assembly when the switch is conducted.

Referring to FIGS. 6 and 7, the switch 29h includes a conducting sheet 29h1 installed on an interior side of the bottom tube 29a. The conducting sheet 29h1 is integrated with the cathode conducting sheet 29f. A positive conducting sheet 29h2 is further installed on the end of the central bar 26, such that the central bar 26 is electrically connected with the positive conducting sheet 29h2. A push button 29h3 is installed on the external sleeve 29b. The push button 29h3 has a lower slanting surface 29h31 pressing against the positive conducting sheet 29h2. Therefore, the electro-thermal winding film 27 is conducted and heated.

Figure 8:
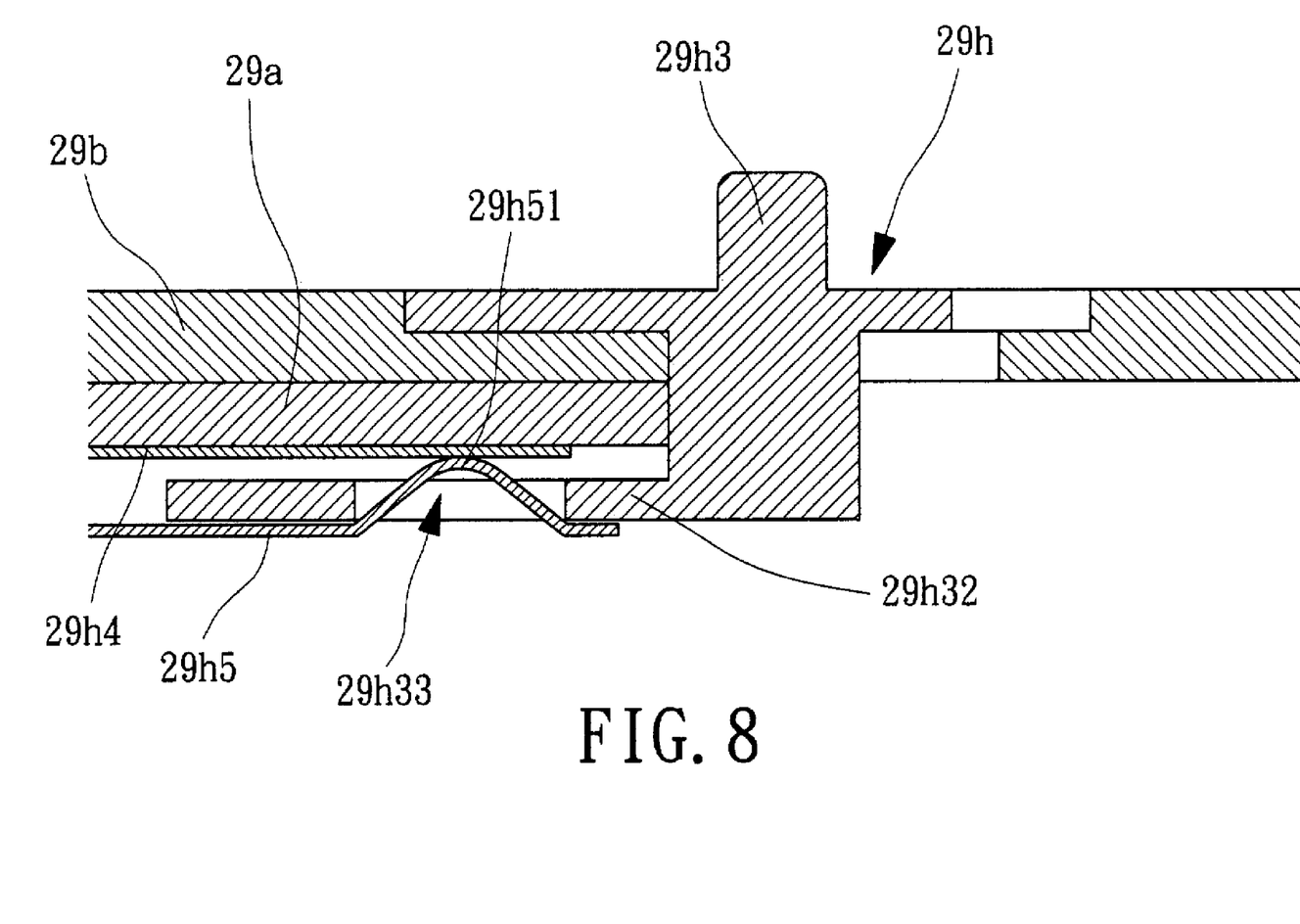
FIG. 8 shows another embodiment of a switch which is not conducted.
Figure 9:
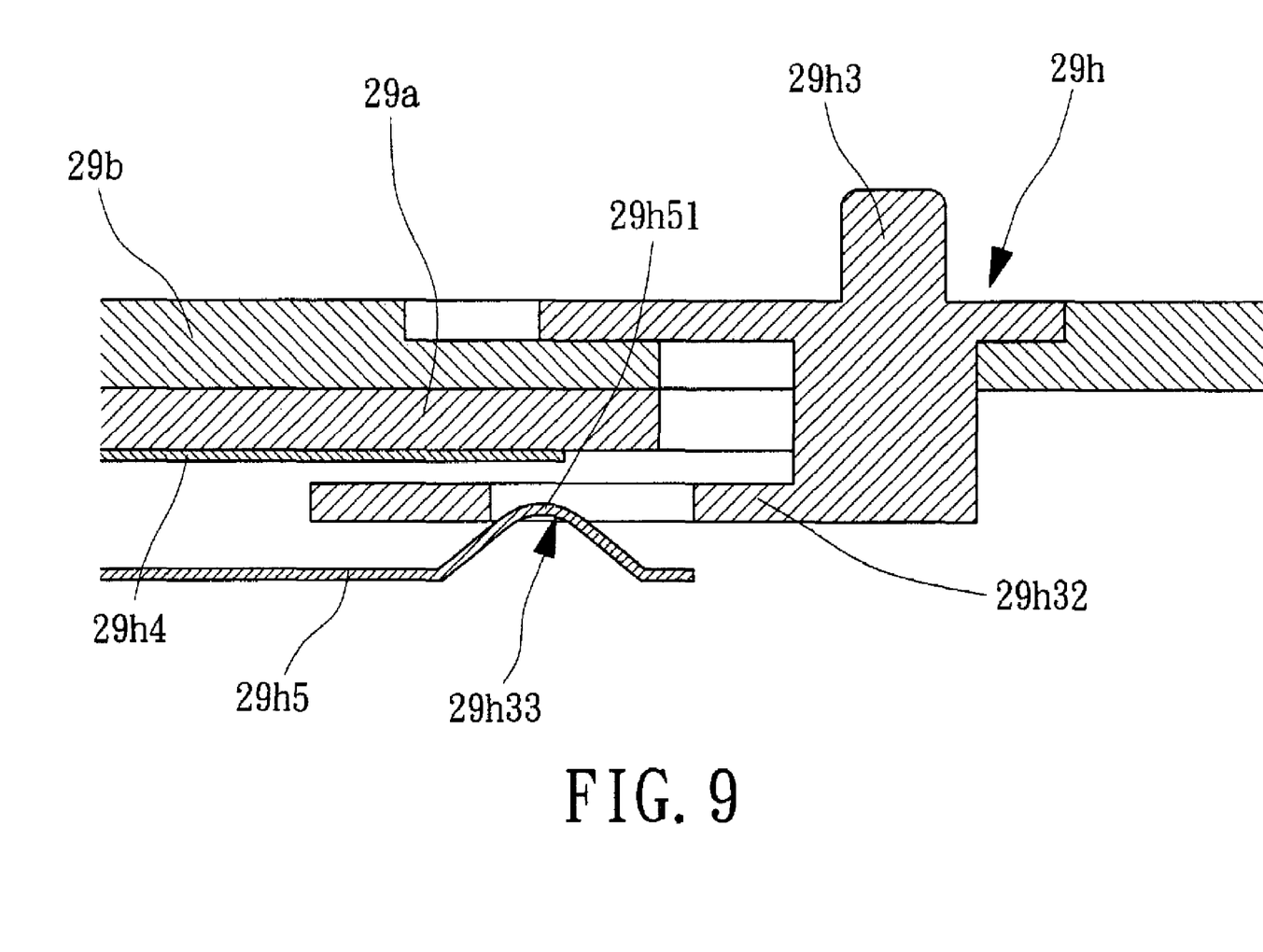
FIG. 9 shows the embodiment as shown in FIG. 8 when the switch is conducted

Referring to FIGS. 7 and 8, the switch 29h includes a fixed conducting sheet 29h4 on an interior side of the bottom tube 29a. The fixed conducting sheet 29h4 is integrated with the cathode lead 29f. A positive conducting sheet 29h5 is mounted to the end of the central bar 26 in the bottom tube 29a, such that the central bar 26 is electrically connected to the positive conducting sheet 29h5. A push button 29h3 is mounted on the external sleeve 29b. The push button 29h32 has a sliding board 29h32 and an aperture 29h33 on the sliding board 29h32. The positive conducting sheet 29h5 has a protrusion 29h51 inserted in the aperture 29h33 of the sliding board 29h32. When the push button 29h3 is pushed forward, the protrusion 29h51 of the positive conducting sheet 29h5 move towards the fixed conducting sheet 29h4. Thereby, the circuit of the electro-thermal winding film 27 is conducted.

The light emitting diode 29g includes a monochromatic light emitting diode or a multi-color light emitting diode. A control circuit is formed on the circuit-board d to control the illumination of the light emitting diode 29g.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A car cigarette lighter, comprising a power socket and a lighter, wherein the power socket includes two opposing splints on a sidewall of a tube thereof, a clip at a bottom of the tube, an insulation block disposed between the tube and the clip, a conducting bar connecting the clip and extending over the tube to connect an anode of a power source while the tube is connected to a cathode of the power source, the lighter includes an external sleeve encasing an internal tube, an insulation column extending within the internal tube, an internal cap and an external cap at two ends of the insulation column, a central bar extending through the internal cap and the insulation column, an electro-thermal winding film at one end of the central bar, a spring disposed between the internal tube and the external cap, a push handle mounted to the external cap, when the lighter is inserted in the power socket, the splints clipping over the external sleeve and pressing the lighter, such that the clip clamping over the internal cap of the internal tube to establish a loop to conduct and heat the electro-thermal winding film, the car cigarette lighter is characterized in:

the handle including an external sleeve encasing a bottom tube, a transparent handle installed on the external sleeve, a circuit board in electrical connection with a lighter circuit, wherein the circuit board comprises at least one light emitting diode at a bottom of the transparent handle and a switch controlling the conduction of the electro-thermal winding film, when the lighter is plugged in the power socket, the light emitting diode is switched on by pushing the push handle, and when the electro-thermal winding film is heated to a predetermined temperature, the clip is deformed to release from the internal tube to eject the internal tube to form an open circuit of the light emitting diode.

2. The car cigarette of claim 1, wherein the light emitting diode is a monochromatic light emitting diode.

3. The car cigarette of claim 1 wherein the light emitting diode is a multi-color light emitting diode.

4. The car cigarette of claim 1, further comprising a controlling circuit for controlling flashing of the light emitting diode.

5. The car cigarette of claim 1, further comprising an anode lead connected between the internal cap and the circuit board.

6. The car cigarette of claim 1, wherein the bottom tube includes two symmetric protrusions to engaged with two respective grooves of the external sleeve.

* * * * *